J. GRIBBEL & C. ATHERTON.
PLAITING MECHANISM.
APPLICATION FILED OCT. 29, 1908.
931,755.
Patented Aug. 24, 1909.
6 SHEETS—SHEET 1.
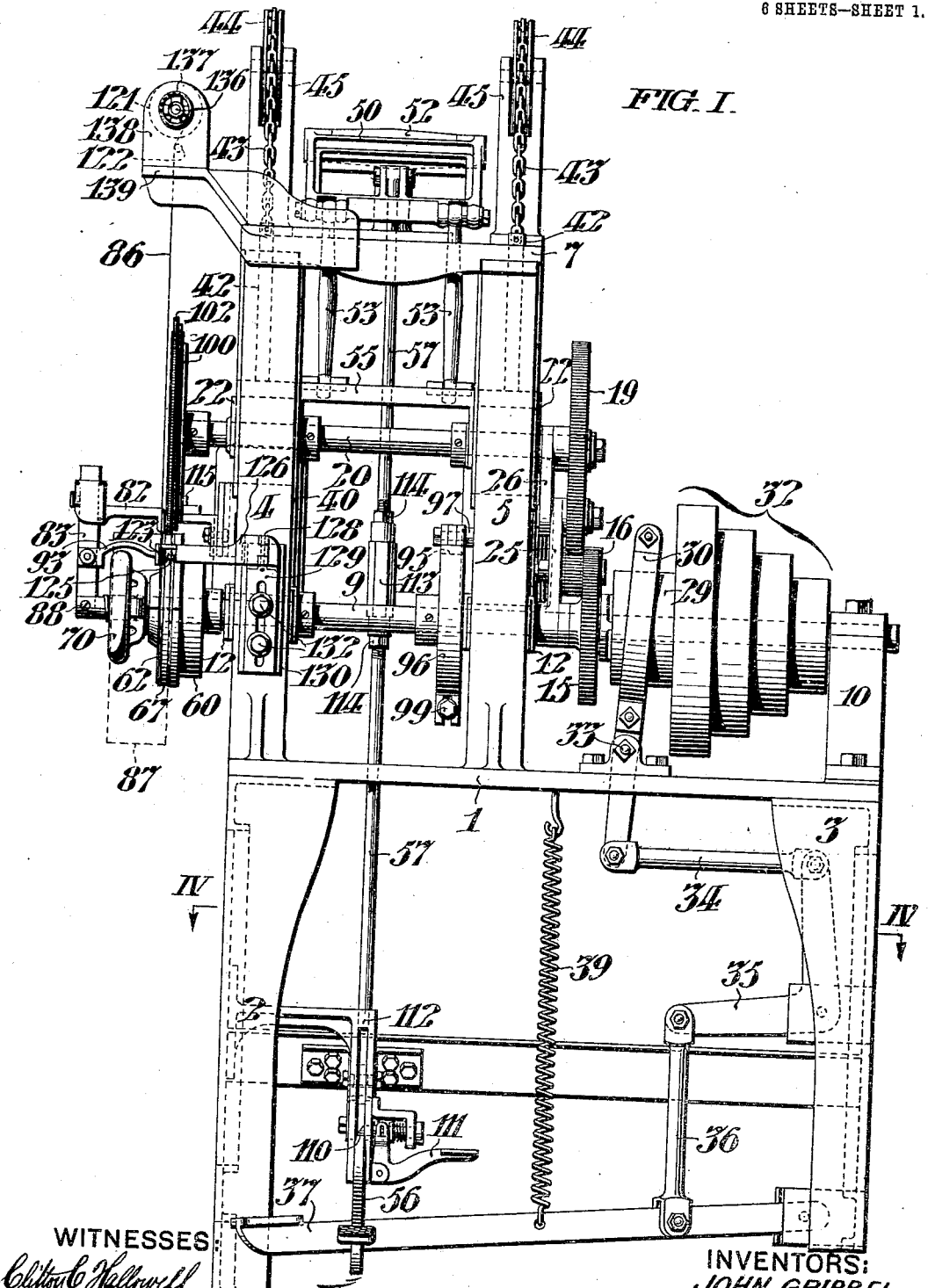
FIG. I.
WITNESSES
INVENTORS:
JOHN GRIBBEL
AND
CHARLES ATHERTON,

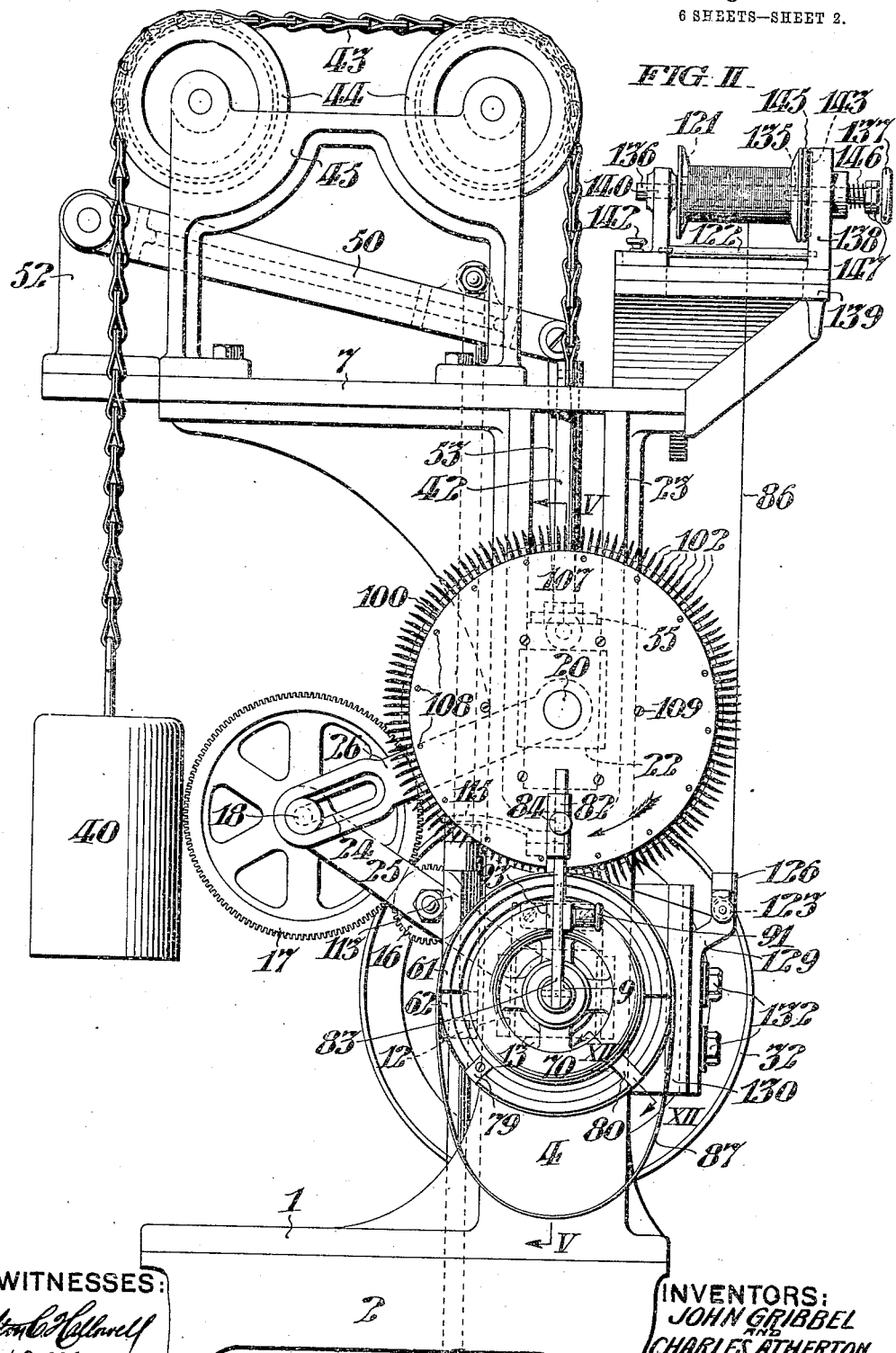

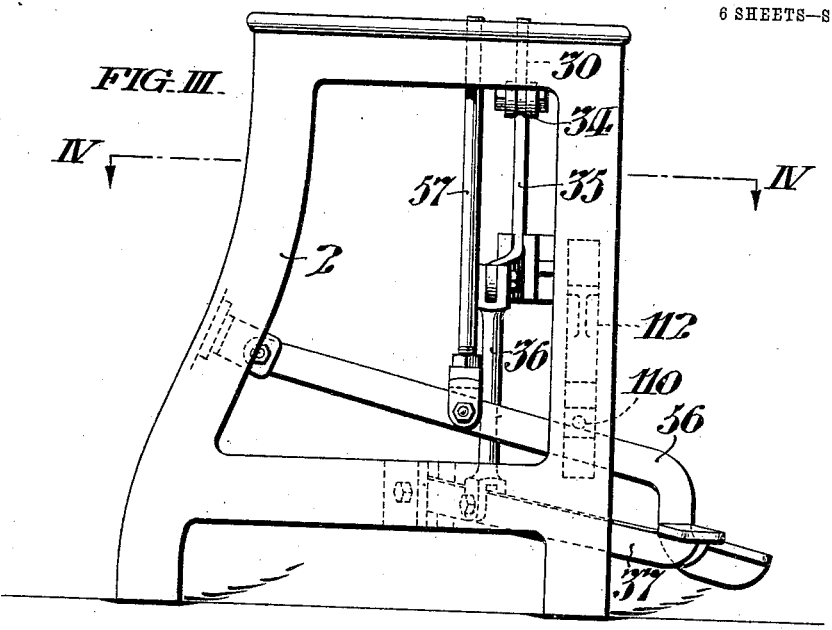
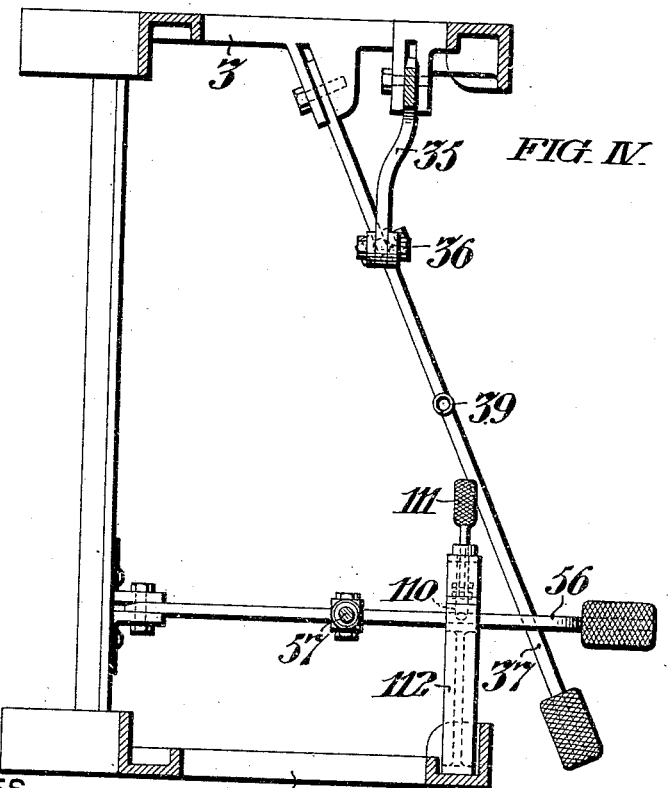

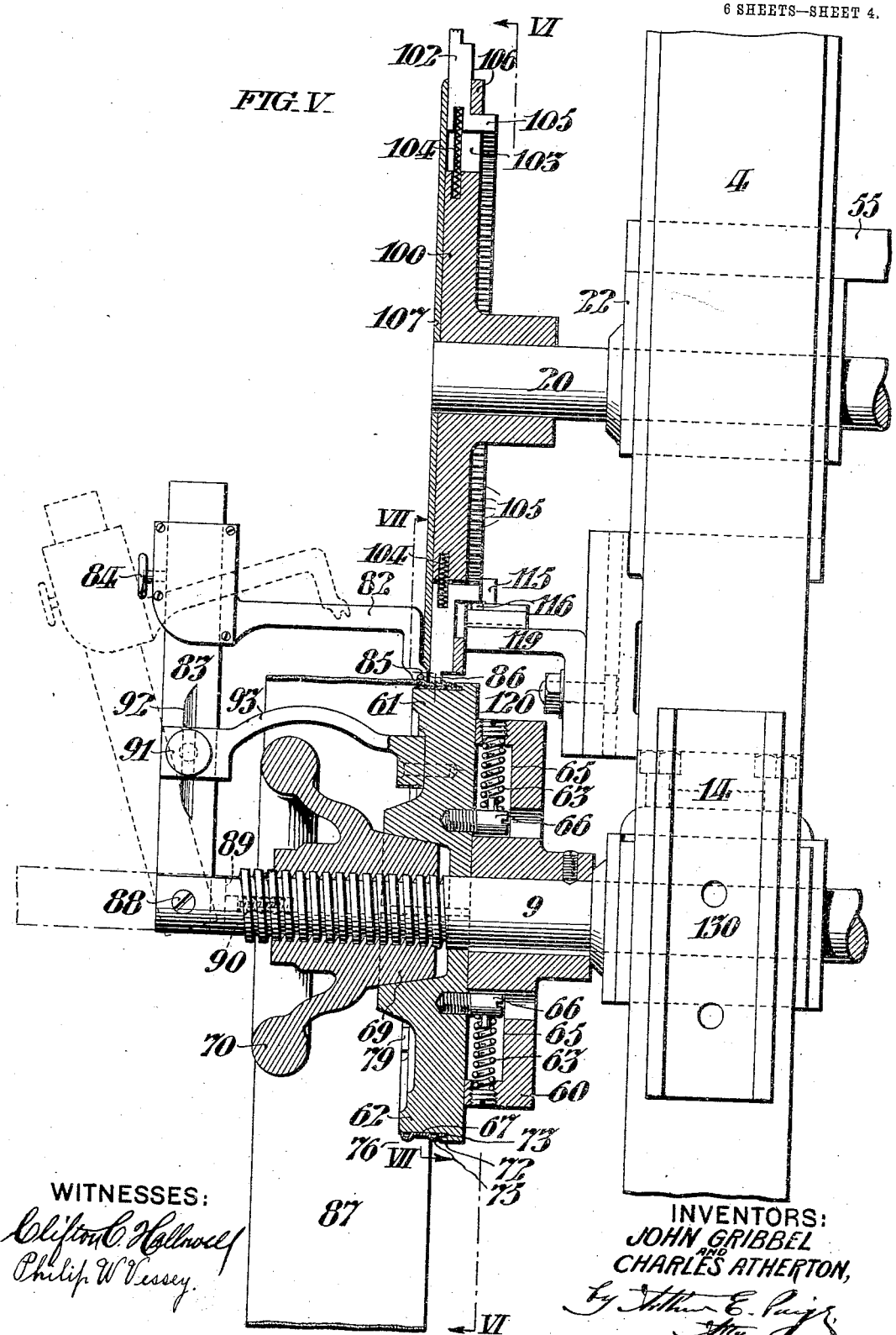

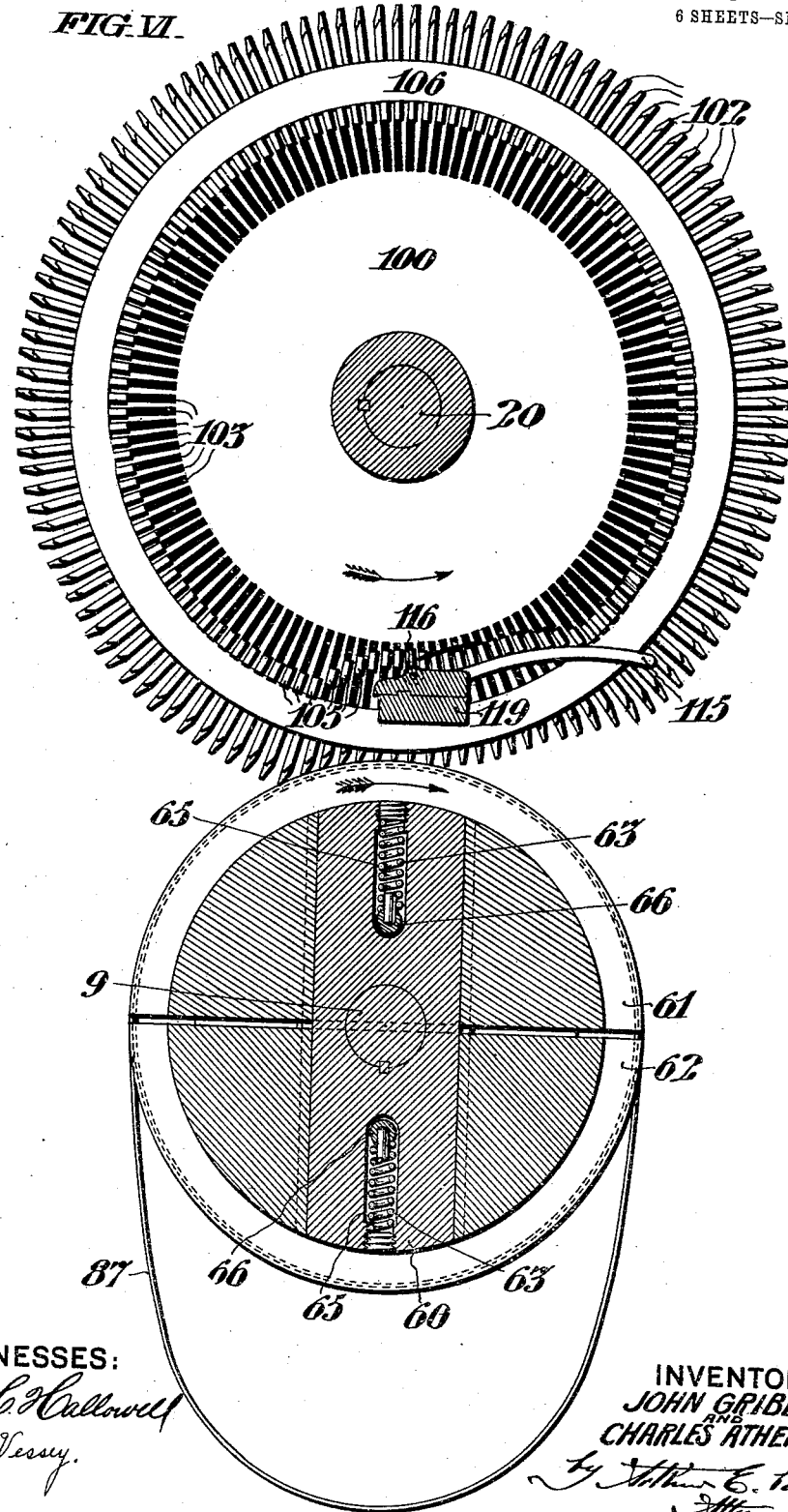

J. GRIBBEL & C. ATHERTON.
PLAITING MECHANISM.
APPLICATION FILED OCT. 29, 1908.
931,755.
Patented Aug. 24, 1909.
6 SHEETS—SHEET 6.
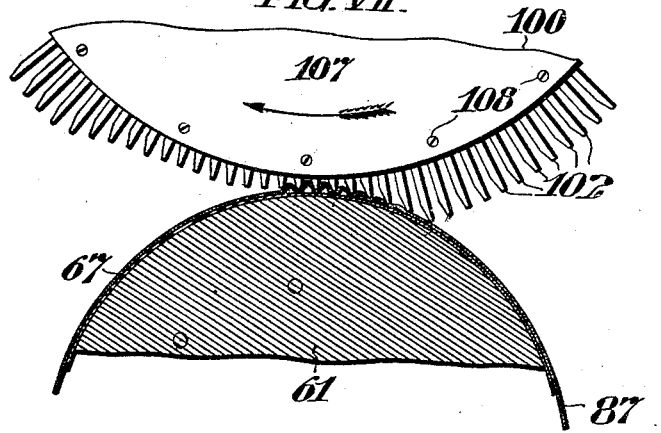
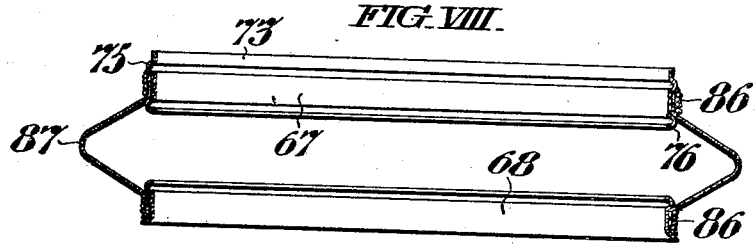
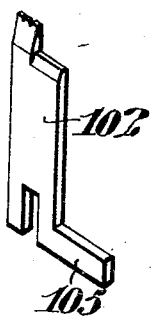
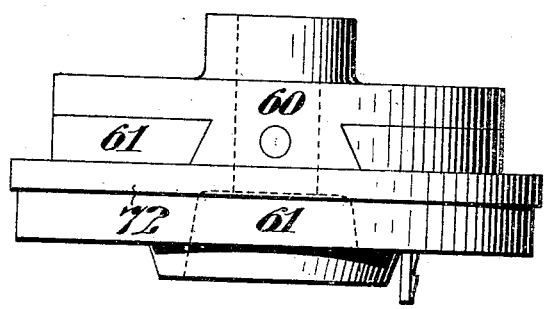
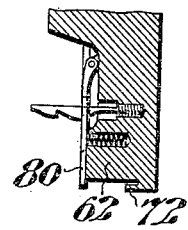
WITNESSES:
INVENTORS:
JOHN GRIBBEL
and
CHARLES ATHERTON,

UNITED STATES PATENT OFFICE.

JOHN GRIBBEL AND CHARLES ATHERTON, OF PHILADELPHIA, PENNSYLVANIA.

PLAITING MECHANISM.

931,755. Specification of Letters Patent. Patented Aug. 24, 1909.

Application filed October 29, 1908. Serial No. 459,989.

*To all whom it may concern:*

Be it known that we, JOHN GRIBBEL and CHARLES ATHERTON, of Philadelphia, in the State of Pennsylvania, have invented a certain new and useful Improvement in Plaiting Mechanism, whereof the following is a specification, reference being had to the accompanying drawings.

Our invention is particularly designed for employment in the manufacture of bellows for gas meters; comprising a pair of similar metallic rings connected by a flexible tube of leather. Said flexible tube is primarily of uniform diameter and larger than the rings to which it is to be attached, and, the machine hereinafter described is operated to plait the ends of said tube so as to fit them to said rings and bind them to the latter.

The form of our invention hereinafter described, comprises an expansible chuck arranged to detachably engage and rotate a bellows ring; means to hold a flexible bellows tube on said ring; a rotary plaiting disk, comprising a peripheral series of radially reciprocatory blades which successively engage and are shifted inwardly by the web of said tube when rotated in contact therewith, so as to corrugate and gather said web in a circular series of plaits, thus reducing the circumference of said web to fit said ring; and, means are provided to wrap a binder cord around the reduced plaited end of said flexible tube to secure it upon said ring.

Our invention comprises the various novel features of construction and arrangement hereinafter more definitely specified.

In the accompanying drawings; Figure I, is a front elevation of a machine conveniently embodying our invention. Fig. II, is a side elevation of the portion of said machine extending above the table shown in Fig. I. Fig. III, is a side elevation of the supporting legs, and controlling levers. Fig. IV, is a plan sectional view, taken on the line IV, IV, in Figs. I and III. Fig. V, is a fragmentary vertical sectional view, on a larger scale, taken on the line V, V, in Fig. II. Fig. VI, is a vertical sectional view taken on the line VI, VI, in Fig. V. Fig. VII, is a fragmentary vertical sectional view, taken on the line VII, VII, in Fig. V, the parts being slightly rotated from the portion shown in Fig. V. Fig. VIII, is a central sectional view of a bellows completed by the employment of our invention. Fig. IX, is a fragmentary sectional view showing the tubular bellows web plaited on the ring and held by the binding cord. Fig. X, is a perspective view of one of the plaiting blades. Fig. XI, is a plan view of the expansible chuck which detachably engages and rotates the bellows ring during the plaiting operation. Fig. XII, is a fragmentary sectional view, taken on the line XII, XII, in Fig. II, showing the spring latch arranged to hold the bellows ring on the chuck jaws.

In said drawings; the table 1, is supported by the legs 2 and 3, and has the standards 4 and 5, supporting the cap plate 7. The main shaft 9, is journaled in the bearing standard 10, and the bearing boxes 12, the latter being retained stationary in their respective recesses 13, in the standards 4 and 5, by the set screws 14, shown in Fig. V. Said shaft 9, has the gear 15, connected by the pinion 16, and the idler 17, with the gear 19, on the counter-shaft 20, which is journaled in the bearing boxes 22, mounted for vertical reciprocation in the recesses 23, in said standards 4 and 5.

As best shown in Fig. II; the idler 17, is mounted on the stud 18, which is adjustable in the slot 24, and forms the pivot of the toggle, comprising the links 25 and 26, respectively mounted on the shafts 9 and 20, whereby the main shaft 9, is operatively geared to rotate the counter-shaft 20, regardless of the relative position of the latter.

The driving shaft 9, has the clutch 29, arranged to be shifted by the strap lever 30, to engage the step pulley 32. Said lever 30, is pivoted at 33, extends below the table 1, and is connected by the link 34, with the bell crank lever 35, which is connected by the link 36, with the foot pedal 37; whereby said lever 30, is shifted under tension of the spring 39, the latter being arranged to return said lever 30, to idle position to disengage said clutch 29, from said pulley.

As best shown in Fig. II; the counter-shaft 20, and its bearing boxes 22, are counterbalanced by the two weights 40, which normally maintain said shaft 20, in its raised or idle position, and which are respectively connected with said boxes by the rods 42, and chains 43, which latter extend over the sheaves 44, journaled in the sheave frames 45, mounted on said cap plate 7. Said counter-shaft 20, being maintained in parallel relation with the driving shaft 9, is arranged to be lowered into operative position, by the rocker frame 50, which is mounted for oscillation in the bracket 52, and connected by the parallel links 53, with the yoke bar 55, connecting said bearing boxes 22; said rocker frame 50, being conveniently shifted by the pedal lever 56, to which it is connected by the link 57. Said main shaft 9, carries the expansible chuck comprising the head 60, in dovetailed relation with the opposed movable semicircular jaws 61 and 62, which are normally collapsed by the springs 63, bearing against the outer wall of the slot 65, in the head 60, and against the studs 66, extending into said slots from said jaws. As best shown in Fig. V; said jaws are arranged to be separated within and thus rotatably engage the diaphragm ring 67, or the ring 68, shown in Fig. VI, by the rotation of the conical wedge 69, which is in threaded engagement with said shaft 9, and provided with the hand wheel 70. As best shown in Fig. V; said jaws 61 and 62, have undercut rims 72, arranged to receive the flange 73, of the ring 67, which also comprises the beads 75 and 76. Said ring 67, is held with its bead 75, in engagement with the edge of the rim 72, by the plate 79, in stationary relation with the jaw 62, and, the spring latch 80, best shown in Fig. XII, pivotally mounted in said jaw 62, engaging the outer edge of said ring; and, by the cord clasp 82, which is adjustably secured to the spring snap lever 83, by the set screw 84, and which comprises the grooved finger 85, arranged to retain the cord 86, and to hold the tubular bellows web 87, on said ring 67, over the bead 76, of the latter. Said spring snap lever 83, is mounted on the pivot 88, in the bifurcated end of the driving shaft 9, and the snap plunger 89, being pressed by the spring 90, is arranged to engage said lever to detain it in either its vertical operative position, or its horizontal inoperative position indicated by the dot and dash lines, in Fig. V, an intermediate position of said lever being indicated by the dotted lines in said figure. Said lever 83, is prevented from accidental displacement when in its operative position by the spring pressed bolt 91, engaging the groove 92, therein; said bolt being mounted to reciprocate in the bifurcated end of the arm 93, extending from the jaw 61, in rigid relation therewith.

The machine is prevented from overrunning by the brake mechanism indicated in Fig. I; comprising the drum 95, carried by the shaft 9, and embraced by the opposed semi-circular straps 96, pivoted on the stud 97, on the standard 5; said straps being arranged to frictionally engage said drum with any desired degree of pressure determined by adjustment of the bolt 99.

The counter-shaft 20, carries the plaiting disk 100, which carries a peripheral series of radially reciprocatory blades 102, mounted in suitable slots 103, and normally projected by their respective springs 104, to an extent limited by the engagement of their respective lugs 105, with the ring 106; said blades being retained in said slots by the cap plate 107, secured to said disk by the screws 108 and 109. In the operative position of said disk 100, the blades 102, are successively forced inwardly by engagement of their serrated points with the tubular web 87, which overlies the ring 67, so that, as best shown in Fig. VII, said blades 102, first engage said web at their maximum extent, and in such inclined relation with the periphery of said ring, as to include a greater circumferential length of said web between the points of adjoining blades, than the distance between said blade points when, by turning said disk, said blades are carried to substantially perpendicular relation to said web. Therefore, as shown in said figure, as the disk 100, is turned, the edge of the tubular web 87, is corrugated and gathered to form plaits which are secured to the ring by the binder cord 86, shown in Figs. I and II; said cord being wound around the plaited region of said web by the rotation of said ring, and being manually tied or otherwise fastened at its ends after a sufficient number of turns have been made. It is to be noted that the plaiting blades 102, engage each web 87 during but one revolution of the chuck, after which the pedal 56, being released, the plaiting disk 100, is uplifted to inoperative position by the weights 40.

The plaiting disk 100, is arranged to be maintained in operative position, by the spring bolt 110, which is automatically shifted to hold the pedal lever 56, in its lowered position, as best shown in Fig. I, and said bolt may be shifted out of engagement with the pedal lever 56, (by the trip lever 111, pivoted to the bifurcated bracket 112,) to release said pedal lever 56, when it is desired to shift said plaiting disk 100, to its inoperative position.

The relative operative position of the shafts 20 and 9, and, consequently, the relation of the plaiting disk 100, to the tube 87, may be variably determined by adjustment of the turnbuckle 113, which connected the two sections of the link 57, and which is prevented from accidental rotation by the jam nuts 114, as best shown in Fig. I.

As it is desirable to withdraw each blade 102, from the web 87, as it effects its plaiting operation; the cam 115, which is provided with a roller 116, is arranged to engage the lugs 105, of the blades 102, and retain them withdrawn until they have progressed sufficiently to clear the plaited web, as best shown in Fig. VI. Said cam 115, is carried by the bracket 119, which is mounted for vertical adjustment, and arranged to be secured in adjusted position by the set screw 120.

The binder cord 86, which is drawn from the bobbin 121, over the roller 122, is fed to the tubular web 87, by the roller 123, which is pressed outwardly, as shown in Fig. I, by the spring 125, so as to guide said cord in successive convolutions around the plaited region of said web. Said roller 123, is carried by the arm 126, hinged at 128, to the bracket 129, which is mounted for vertical adjustment in the block 130, and secured thereto by the set screws 132.

The bobbin 121, is mounted in engagement with the key 135, on the rotary spindle 136, which is provided with the hand wheel 137, and journaled in the bobbin frame 138, mounted on the bracket 139. Said frame comprises the detachable bearing 140, secured by the set screw 142, which may be removed to insert said bobbin.

The tension of the cord 86, is controlled by the tension regulator, comprising the leather disk 143, interposed between the frame 137, and the circular flange 145, the latter being rigid on the spindle 136, and frictionally engaged with said leather disk 143, by the spring 146, the effective pressure of the latter may be varied by the adjusting nuts 147.

It may be here noted that rings of greater or less diameter than the ring 67, may be employed, by substituting for the jaws 61 and 62, other jaws corresponding in diameter to said rings, and by substituting a corresponding idler, for the idler 17.

As shown in Fig. VII, the bellows web 87, is arranged to be secured at its opposite edges to the respective rings 67 and 68, and although we have described a machine for securing the web on said rings separately, it is to be understood that such a machine may be provided with plaiting disks arranged in duplicate, to secure said web on both of said rings simultaneously.

We do not desire to limit ourselves to the precise details of construction and arrangement herein specified, as it is obvious that various modifications may be made therein, without departing from the essential features of our invention, as defined in the appended claims.

We claim:—

1. The combination with a circular disk having a series of peripheral slots; of blades mounted to reciprocate radially in said slots and having serrated points; and, means arranged to present a web in position to be plaited by said blades.

2. The combination with a circular disk having a series of peripheral slots; of blades mounted to reciprocate radially in said slots and having serrated points; means arranged to normally thrust said blades outward; and, means arranged to present a web in position to be plaited by said blades.

3. The combination with a circular disk having a series of peripheral slots; of radially reciprocatory blades mounted in said slots and having laterally extending lugs; means tending to thrust said blades outwardly; a ring arranged to engage said lugs to limit the outward movement of said blades; and, means arranged to present a web in position to be plaited by said blades.

4. The combination with a disk having a series of peripheral slots extending radially therein; of reciprocatory blades mounted in said slots and having lateral lugs; means arranged to thrust said blades outwardly; a ring surrounding said lugs arranged to limit the outward movement of said blades; means arranged to present a web in position to be plaited by said blades, and to successively retract said blades; and a cam arranged to engage said lugs, to retain said blades in retracted position.

5. The combination with means arranged to support a flexible web; of a plaiting disk having a series of peripheral slots; radially reciprocatory blades, mounted in said slots, arranged to engage said web, and be retracted inwardly by said web support to form plaits in said web; means tending to project said blades outwardly; and means comprising a cam arranged to retract said blades from said web, after their plaiting operation.

6. The combination with means arranged to support a web; of a plaiting disk having a series of peripheral slots; radially reciprocatory blades mounted in said slots, arranged to be shifted inwardly by said web support, to plait the web, and having lugs extending laterally from said disk; means tending to shift said blades outwardly; a ring arranged to limit the outward movement of said blades; and a cam arranged to withdraw said blades from said web.

7. The combination with means arranged to carry a flexible web; of a rotary disk carrying radially reciprocatory blades, arranged to successively engage said web in such inclined relation, as to include a greater extent of said web between the points of adjacent blades than when said blades are turned to normal relation to said web; whereby said web is gathered between said points to form plaits.

8. The combination with a rotary member arranged to carry a tubular flexible web; of a rotary disk carrying radially reciprocatory blades arranged to successively engage said web in such inclined relation, as to include a greater circumferential extent of said web between the points of adjacent blades than when said blades are turned to normal relation to said web; whereby said web is gathered between said points to form plaits.

9. The combination with an expansible chuck arranged to rotatably hold a bellows ring; of means arranged to hold a flexible web on said ring; a plaiting disk carrying a series of radially reciprocatory plaiting blades extending therefrom, and arranged to be successively retracted in engagement with said web, by its support, when rotated in contact therewith; whereby said web is gathered to form plaits between said blades, and thus contracted on said ring.

10. The combination with an expansible chuck arranged to rotatably hold a bellows ring; of means arranged to hold a flexible tubular web on said ring; a plaiting disk geared to rotate with said chuck, and carrying a series of radially reciprocatory plaiting blades, arranged to be successively retracted in engagement with said web by its support when rotated in contact therewith; whereby said web is gathered to form plaits between said blades, and thus contracted on said ring.

11. The combination with an expansible chuck arranged to rotatably hold a bellows ring; of a clasp arranged to hold a flexible tubular web on said ring; a plaiting disk carrying a peripheral series of radially reciprocating plaiting blades, arranged to be successively retracted in engagement with said web, by its support, when rotated in contact therewith; whereby said web is gathered to form plaits between said blades, and thus contracted on said ring; and, means arranged to wrap a binder cord around said plaits to secure the bellows tube on said ring.

12. The combination with a chuck comprising opposed movable jaws; of means tending to collapse said jaws; means arranged to separate said jaws to expand them within a ring; means arranged to hold a flexible tubular web on said ring; a plaiting disk geared to rotate with said chuck, and carrying a series of radially reciprocatory plaiting blades, arranged to be successively retracted in engagement with said web, by its support, when rotated in contact therewith; whereby said web is gathered to form plaits between said blades, and thus contracted on said ring.

13. The combination with a chuck comprising opposed movable jaws; of means tending to collapse said jaws; means arranged to separate said jaws to expand them within a ring; and, a plaiting disk carrying a series of peripheral blades arranged to engage a flexible web on said ring; whereby, said web is plaited as said disk and chuck are rotated.

14. The combination with a chuck comprising opposed movable jaws; of means tending to collapse said jaws; means arranged to separate said jaws to expand them within a ring; a plaiting disk carrying a series of peripheral blades arranged to engage a flexible web on said ring, whereby, said web is plaited as said disk and chuck are rotated; and, means arranged to secure said web on said ring where plaited.

15. The combination with a chuck having opposed movable jaws; of means tending to collapse said jaws; means arranged to separate said jaws to expand them within a ring; a plaiting disk geared to rotate with said chuck, and carrying a series of radially reciprocatory plaiting blades, arranged to be successively retracted in engagement with said web, by its support, when rotated in contact therewith; whereby said web is gathered to form plaits between said blades, and thus contracted on said ring; and, means arranged to wrap a cord around said web where plaited.

16. The combination with a rotary member arranged to carry a ring; of means arranged to retain said ring on said rotary member; means arranged to hold a flexible tube on said ring; a plaiting disk carrying a series of blades arranged to engage said tube against said ring, whereby, said web is gathered to form plaits between said blades, and thus contracted on said ring.

17. The combination with a rotary expansible member arranged to carry a ring; of means arranged to retain said ring on said member; means arranged to expand said member within said ring; a spring clasp arranged to hold a cord, and to engage a flexible tube on said ring; a plaiting disk movable toward and away from said rotary member; a series of blades arranged for radial reciprocation, extending from the periphery of said disk; means arranged to shift said disk to engage said blades with said tube, to such an extent that the blades are shifted inwardly, by engagement with said web when rotated in contact therewith, whereby said web is gathered to form plaits between said blades, and thus contracted on said ring, and, the plaited region of said web is bound on said ring, by said cord.

18. The combination with a rotary member having expansible jaws; of means tending to collapse said jaws; a conical wedge arranged to separate said jaws to expand them within a ring; a spring clasp arranged to hold a cord in engagement with a flexible tube on said ring; a guiding roller for said cord; an arm carrying said roller; and, a spring tending to thrust said roller in alinement with said spring clasp; whereby the cord is wound in successive convolutions around said tube; a plaiting disk movable toward and away from said rotary member; a series of blades mounted for radial reciprocation in said disk, and extending radially from the periphery thereof; and, means arranged to shift said disk to engage said blades with said tube; whereby said web is gathered to form plaits between said blades, and thus contracted on said ring;

and, means arranged to withdraw said blades from said tube after their plaiting operation.

19. The combination with a rotary member having expansible jaws; of means tending to collapse said jaws; a rotary conical wedge arranged to separate said jaws to expand them within a ring; a spring clasp having a grooved finger, arranged to hold a cord in engagement with a flexible tube on said ring; a guiding roller for said cord; an arm carrying said roller, and, a spring tending to thrust said roller in alinement with the groove in said finger; whereby, said cord is wound upon said tube in successive convolutions; a plaiting disk movable toward and away from said rotary member; a series of blades mounted for radial reciprocation in said disk, and extending from the periphery thereof; means arranged to shift said disk to engage said blades with said tube, in such inclined relation, as to include a greater circumferential extent of said web between the points of adjacent blades than when said blades are turned to normal relation to said web; whereby said web is gathered between said points to form plaits; and, a cam arranged to withdraw said blades from said tube after their plaiting operation.

20. The combination with a driving shaft; of a countershaft arranged to move toward and away from said driving shaft; bearing boxes for said countershaft; a yoke bar connecting said bearing boxes; means arranged to maintain said countershaft in parallel relation with said driving shaft; means arranged to shift said bar to move said countershaft with respect to said driving shaft; a rotary member carried by said driving shaft and having expansible jaws; means tending to collapse said jaws; a rotary conical wedge in threaded engagement with said driving shaft, arranged to expand said jaws to engage a ring; a spring clasp arranged to hold a cord, and to engage a tube with said ring; a plaiting disk carried by said countershaft; a series of blades extending in radial relation therefrom, and arranged for radial reciprocation; means tending to thrust said blades outwardly; and, means arranged to shift said countershaft toward said driving shaft to engage said blades with said tube; whereby, said tube is gathered by said blades to form plaits when rotated.

21. The combination with a driving shaft; of a countershaft arranged to reciprocate toward and away from said driving shaft; bearing boxes for said countershaft; a yoke bar connecting said bearing boxes; a rocker frame; links connecting said rocker frame with said yoke bar; a pedal connected with said rocker frame, arranged to shift its free end downward; weights; flexible connectors, connecting said weights with said rocker frame, arranged to uplift said countershaft; a chuck on said driving shaft; expansible jaws carried by said chuck, arranged to hold a ring; a conical wedge in threaded engagement with said driving shaft, arranged to expand said jaws within said ring; a spring clasp arranged to hold a cord; and to engage a flexible tube on said ring; means arranged to secure said clasp in operative position, comprising an arm extending from one of said jaws, and having a spring bolt arranged to engage said spring clasp; a plaiting disk carried by said countershaft; a peripheral series of radially extending blades arranged to radially reciprocate in said disk and engage said tube; lugs extending laterally through slots in said disk; and an adjustable cam arranged to engage said lugs and withdraw said blades from said tube after their plaiting operation.

22. The combination with a rotary member arranged to carry a ring; of means arranged to retain said ring on said rotary member; means arranged to hold a flexible tube on said ring; and, a plaiting disk carrying a series of blades arranged to engage said tube against said ring, whereby, said web is gathered to form plaits between said blades, and thus contracted on said ring; a frame arranged to support said disk; a pedal lever arranged to shift said frame and disk to engage said blades with said tube; and a spring-bolt arranged to hold said pedal lever in its lowered position when depressed to shift said disk into operative position.

23. The combination with a rotary member arranged to carry a ring; of means arranged to retain said ring on said rotary member; means arranged to hold a flexible tube on said ring, and, a plaiting disk carrying a series of blades arranged to engage said tube against said ring, whereby, said web is gathered to form plaits between said blades, and thus contracted on said ring; a frame arranged to support said disk; a pedal lever arranged to shift said frame and disk to engage said blades with said tube; a link connecting said frame and said pedal lever; a spring-bolt arranged to be automatically shifted to engage said pedal lever in its lowered position when depressed to shift said disk into operative position; and, means arranged to vary the length of said link and thereby variably determine the operative relation between said disk and tube.

24. The combination with a rotary expansible member arranged to carry a ring; of means arranged to retain said ring on said member; means arranged to expand said member within said ring; means arranged to engage a flexible tube on said ring; a plaiting disk movable toward and away from said rotary member; a rocker frame supporting said disk; a series of plaiting blades, arranged for radial reciprocation, extending from the periphery of said disk; means, comprising a pedal lever, arranged to rock said frame to shift said disk and engage said blades with said tube to such an extent that the blades are shifted inwardly by engagement with said web when rotated in contact therewith; and, means comprising a spring-bolt, arranged to maintain said pedal lever in operative position.

25. The combination with a rotary expansible member arranged to carry a ring; of means arranged to retain said ring on said member; means arranged to expand said member within said ring; a spring clasp arranged to engage a flexible tube on said ring; a plaiting disk movable toward and away from said rotary member; a series of plaiting blades, arranged for radial reciprocation, extending from the periphery of said disk; means comprising a pedal lever arranged to shift said disk into operative position to engage said blades with said tube to such an extent that the blades are shifted inwardly by engagement with said web when rotated in contact therewith; a link connecting said pedal lever and said disk; a spring bolt automatically actuated to retain said pedal lever in said operative position; means comprising a trip pedal arranged to shift said spring bolt to release said pedal lever when it is desired to shift said disk to inoperative position; and means arranged to vary the relative operative position of said plaiting disk and rotary member, whereby, the extent of the inward movement of said blades is determined.

In testimony whereof, we have hereunto signed our names at Philadelphia, Pennsylvania, this 26th day of October, 1908.

JOHN GRIBBEL.
CHARLES ATHERTON.

Witnesses:
S. E. SIMMONDS,
F. H. WORDEMAN.

It is hereby certified that in Letters Patent No. 931,755, granted August 24, 1909, upon the application of John Gribbel and Charles Atherton, of Philadelphia, Pennsylvania, for an improvement in "Plaiting Mechanism," errors appear in the printed specification requiring correction, as follows: In line 16, page 4, after the word "web" a comma should be inserted, line 17, after the word "support" a comma should be inserted, and lines 25–26 the word "reciprocating" should read *reciprocatory;* and that the said Letters Patent should be read with these corrections therein that the same may conform to the record of the case in the Patent Office.

Signed and sealed this 14th day of September, A. D., 1909.

[SEAL.]
F. A. TENNANT,
*Acting Commissioner of Patents.*